US011079998B2

(12) United States Patent
He et al.

(10) Patent No.: US 11,079,998 B2
(45) Date of Patent: Aug. 3, 2021

(54) EXECUTING A DEMO IN VIEWER'S OWN ENVIRONMENT

(71) Applicant: International Business Machines Corporation, Armonk, NY (US)

(72) Inventors: Jenny Jing He, Chandler's Ford (GB); Joe Winchester, Hursley (GB); Adrian Kyte, Broadstone (GB); Cheng Fang Wang, Shangdi (CN); Ping Xiao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 16/250,709

(22) Filed: Jan. 17, 2019

(65) Prior Publication Data
US 2020/0233628 A1    Jul. 23, 2020

(51) Int. Cl.
*G06F 3/14* (2006.01)
*G06F 9/445* (2018.01)
*G06F 9/455* (2018.01)

(52) U.S. Cl.
CPC ............ *G06F 3/1454* (2013.01); *G06F 9/445* (2013.01); *G06F 9/455* (2013.01)

(58) Field of Classification Search
CPC .... G06F 3/1454; G06F 40/103; G06F 40/137; G06F 40/169; G06F 16/55; G06F 16/93; G06F 3/048; G06F 40/106; G06F 40/197; G06F 9/451
See application file for complete search history.

(56) References Cited

U.S. PATENT DOCUMENTS

| | | | | |
|---|---|---|---|---|
| 9,087,353 B2 | 7/2015 | Razvi et al. | | |
| 9,330,081 B2 | 5/2016 | Gwin et al. | | |
| 9,633,358 B2* | 4/2017 | Kolowich | .......... | G06Q 30/0201 |
| 2001/0023436 A1* | 9/2001 | Srinivasan | ........... | H04N 21/812 |
| | | | | 709/219 |
| 2008/0092168 A1* | 4/2008 | Logan | ................ | H04N 21/4782 |
| | | | | 725/44 |
| 2011/0264705 A1* | 10/2011 | Diamond | ............ | G06F 16/4393 |
| | | | | 707/803 |

(Continued)

OTHER PUBLICATIONS

Cohan; "Achieving Success With Remote Software Demonstrations"; Pragmatic Marketing; URL <https://www.pragmaticmarketing.com/resources/articles/Achieving-Success-With-Remote-Software-Demonstrations> (retrieved Jul. 19, 2018) (3 pages).

(Continued)

*Primary Examiner* — Maryam M Ipakchi
(74) *Attorney, Agent, or Firm* — Cantor Colburn LLP; Teddi Maranzano (57) ABSTRACT

A system, computer-implemented method, and computer program product for demonstrating a software application on a computer. The system includes a capture component running in a presenter environment and an invoker component running in a viewer environment. One or more steps performed by a presenter on a first copy of a software application being run in the presenter environment are recorded at the capture component. The invoker component access the one or more steps and performs the one or more steps on a second copy of the software application being run in the viewer environment.

17 Claims, 8 Drawing Sheets

(56) References Cited

U.S. PATENT DOCUMENTS

| | | | | |
|---|---|---|---|---|
| 2013/0315568 A1* | 11/2013 | Boyd | ................... | G06F 40/106 |
| | | | | 386/282 |
| 2014/0089826 A1* | 3/2014 | Boyd | .................. | G11B 27/031 |
| | | | | 715/765 |
| 2015/0106091 A1* | 4/2015 | Wetjen | .................. | H04M 3/568 |
| | | | | 704/235 |
| 2015/0244758 A1* | 8/2015 | Kolowich | .......... | H04N 21/4223 |
| | | | | 709/231 |
| 2016/0227162 A1* | 8/2016 | Bargetzi | .............. | G06F 3/04842 |
| 2017/0249669 A1 | 8/2017 | High et al. | | |
| 2017/0344386 A1 | 11/2017 | Charters et al. | | |
| 2018/0047115 A1 | 2/2018 | Jemiolo et al. | | |
| 2018/0160133 A1* | 6/2018 | Gleason | ................ | G06F 3/0647 |
| 2018/0167426 A1 | 6/2018 | Sigurdsson et al. | | |

OTHER PUBLICATIONS

Dam; "How to Make Amazing Video Tutorials With Activepresenter?"; Atomi Systems, Inc.; Screencasting; URL <https://atomisystems.com/screencasting/make-video-tutorials-activepresenter/>; Feb. 27, 2017 (6 pages).

\* cited by examiner

EXECUTING A DEMO IN VIEWER'S OWN ENVIRONMENT

BACKGROUND

The present invention relates generally to software presentations and, in particular to a system and method for presenting a software demonstration that allows a viewer or student to learn by walking through steps presented by a presenter or instructor.

Software presentation and demonstration often includes a presenter or teacher and a viewer or student. The viewer watches a copy of the software application at a computer screen, while the presenter manipulates the software application at the viewer's screen either from a different computer or via recorded instructions in order to demonstrate the operation of the software application. If the viewer wishes to recreate the steps performing by the presenter, they must take accurate notes and rely on documents and screen shots for recall. This method of learning is full of inefficiencies and does not ensure that the viewer learns the exact steps demonstrated by the presenter.

SUMMARY

Embodiments of the present invention are directed to a computer-implemented method for demonstrating a software application on a computer. A non-limiting example of the computer-implemented method includes recording, at a capture component in a presenter environment run on the computer, one or more steps performed by a presenter on a first copy of the software application being run in the presenter environment; accessing, by an invoker component in a viewer environment run on computer, the one or more steps; and performing, by the invoker component, the one or more steps on a second copy of the software application being run in the viewer environment.

Embodiments of the present invention are directed to a system for demonstrating a software application. A non-limiting example of the system includes a capture component configured to record a step of a presenter at a first copy of the software application in a presenter environment; and an invoker component configured to receive the step and perform the step on a second copy of the software application in a viewer environment.

Embodiments of the present invention are directed to a computer program product for demonstrating a software application. A non-limiting example of the computer program product includes a computer readable storage medium having program instructions embodied therewith, the program instructions executable by a processor to cause the processor to perform: recording, at a capture component in a presenter environment run on the computer, one or more steps performed by a presenter on a first copy of the software application being run in the presenter environment; accessing, by an invoker component in a viewer environment run on computer, the one or more steps; and performing, by the invoker component, the one or more steps on a second copy of the software application being run in the viewer environment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 2-7 shows scripts that have been transcribed from actions taken by a presenter for illustrative purpose;

DETAILED DESCRIPTION

An embodiment disclosed herein provides a system and method for demonstrating a software application. The demonstration system includes a presenter environment in which a presenter or teacher demonstrates various operations of the software application and a viewer environment which shows a copy of the software application and reproduces the various operations performed by the teacher, for the enlightenment of the viewer. The system includes a capture component that records a script based on the presenter's actions and an invoker component that allows the viewer to follow the script by "walking through" the actions of the presenter.

Figure 1:
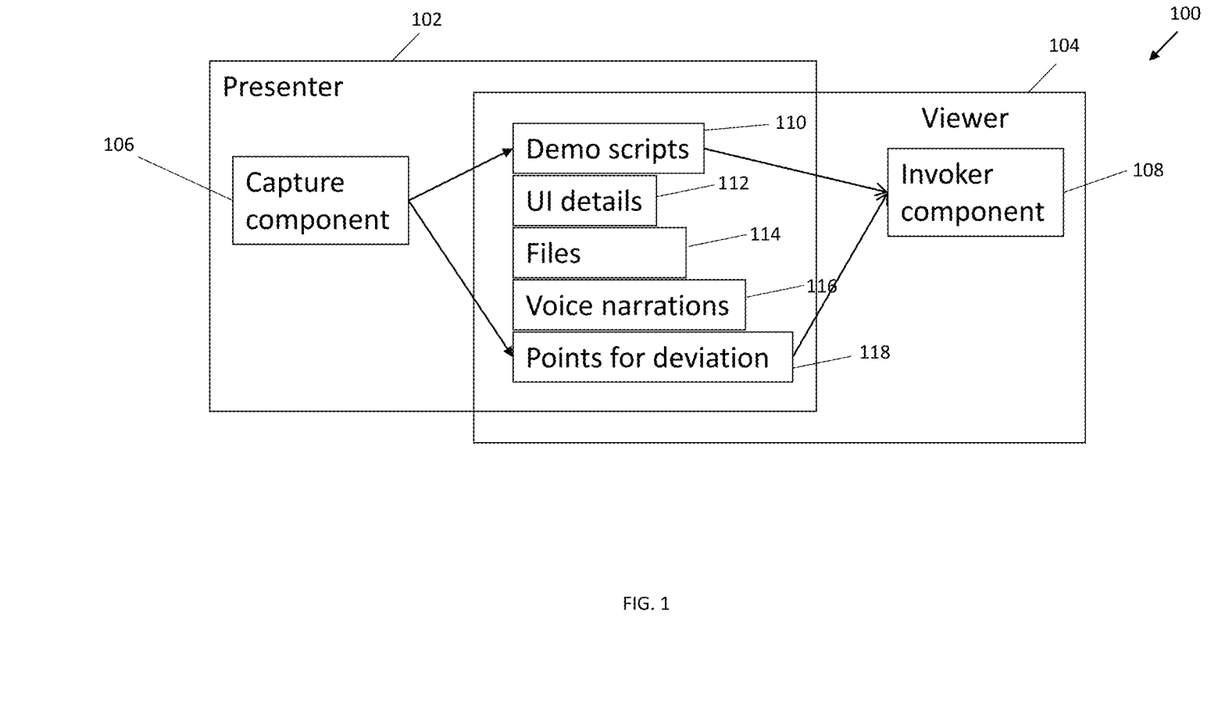
FIG. 1 illustrates schematically a system for demonstrating a software application to a viewer.

FIG. 1 illustrates schematically a system 100 for demonstrating a software application to a viewer. The system 100 can be operated on a processor, server or other computer or computing device. The system 100 includes a presenter environment 102 and a viewer environment 104. In various embodiments, the presenter environment 102 can be provided to a presenter device or presenter computer at a first location in communication with the processor and the viewer environment 104 can be provided to a viewer device or viewer computer in communication with the processor.

In various embodiments, elements of the presenter environment 102 and the viewer environment 104 overlap or are shared in order to implement a demonstration of the software application as disclosed herein. In particular, a presenter at the presenter environment 102 operates and demonstrates the software application by performing various actions or steps at a presenter's copy of the software application being run in the presenter environment 102. A viewer at the viewer environment 104 is then able to observe a viewer's copy of the software application that mimics the presenter's actions. The viewer can also learn how to use the software application by performing the same steps as the presenter except at the viewer's copy of the software application being run in the viewer environment 104.

The presenter environment 102 includes a capture component 106 that captures the actions of the presenter as the presenter operates or demonstrates the software application. In particular, the capture component captures any demonstration scripts 110, user interface details 112, files 114, voice narration 116, points for exploration 118, etc., that are implemented by the presenter while demonstrating the software application.

The viewer environment 104 includes an invoker component 108 that allows the viewer to walk through the presenter's demonstration using the demonstration scripts 110, user interface details 112, files 114, voice narration 116, points for exploration 118, etc., that were implemented by the presenter at the presenter environment 102.

In the presenter environment 102, the capture component 106 captures or records action performed by the presenter during the demonstration by transcribing the actions into a script 110. Any files 114 that are used during the demonstration at the presenter environment 102 can be provided to the viewer at the viewer environment 104. The presenter environment 102 can include a microphone or voice recorder that records any audible instructions or voice narration 116 from the presenter. An exploration point 118 allows the viewer exit from the script 110, at least temporarily, in order to exercise the software application themselves, based what has been learned from the script 110, or to satiate some curiosity, etc. The viewer can return to the script 110 when ready to resume the lesson. The script 110, user interface details 112, files 114, voice narration 116 and exploration point 118 can be provided to the viewer environment 104.

At the viewer environment 104, the invoker component 108 allows the viewer to follow along with the demonstration by performing the actions of the presenter at the viewer's copy of the software application. The viewer can recreate the steps of the presenter by moving through the script 110 created by the presenter and having access to user interface details 112, files 114, voice narration 116 and exploration point 118. The viewer can optionally move through the steps of the script at a rate different to that used by the presenter. The invoker component 108 can restrict the viewer's actions only to those actions that are in the script 110 created by the presenter. An exception to following the script 110 can occur when the viewer reaches an exploration point 118 and selects to exit the script 110 at the exploration point 118. When the viewer "steps out" of the script 110 at the exploration point 118, the most recent state of the viewer environment 104 before the exploration point is recorded so that the viewer can return to the most recent state when ready to return to the lesson.

In various embodiments, the invoker component 108 allows the viewer to step backward through the script 110 to a previous point or step forward to the next point in the script 110. Such a step method allows the viewer to move through the demonstration multiple times or pausing.

FIGS. 2-7 shows a plurality of steps performed in an illustrative demonstration of a software application.

In preparing a script, the capture component 106 creates a script template that captures metadata of the software application. The script can be an XML script or any other suitable script in various embodiments. The capture component 106 captures the presenter's demonstration, making use of a tracking tool that follows the software demonstration and recording details of the demonstration. These details can include, but are not limited to, a software's name, version, and build number. An illustrated script for the software application metadata is shown below:

```
application name="SoftwareAppABCD"
version=5.4 build=201703211000>
</application>
```

Additional script resulting from the actions of the present are inserted between these two lines.

FIGS. 2-5 shows various software states based on the actions taken by a presenter, for illustrative purposes.

Figure 2:
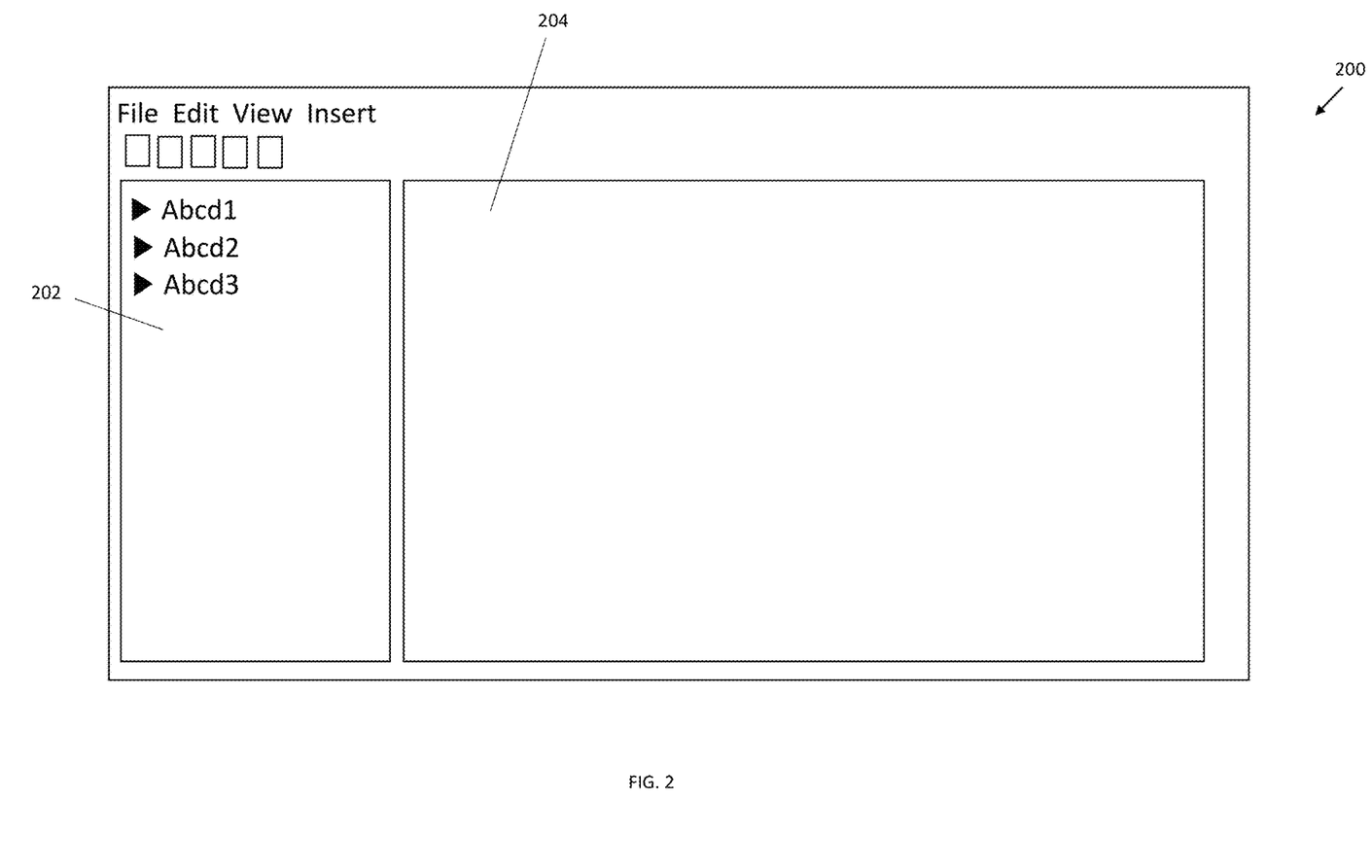
FIG. 2 shows a screenshot illustrating of a software application that has just been opened at a presenter environment of the system of FIG. 1.

FIG. 2 shows a screen shot 200 illustrating of a software application that has just been opened at the presenter environment 102. The software application has a directory area 202 and a workplace area 204. When the presenter opens the software application, the capture component 106 receives the instructions entered by the presenter for opening the software application and creates a corresponding script. An illustrative script for opening the software application is shown below:

```
<step1 action=startapp parameter=workspace_location
perspective=resource>
<gif file=20170324143503.gif />
<window size=full-screen />
<app-specific view="Project Explorer">
</step1>
```

Figure 3:
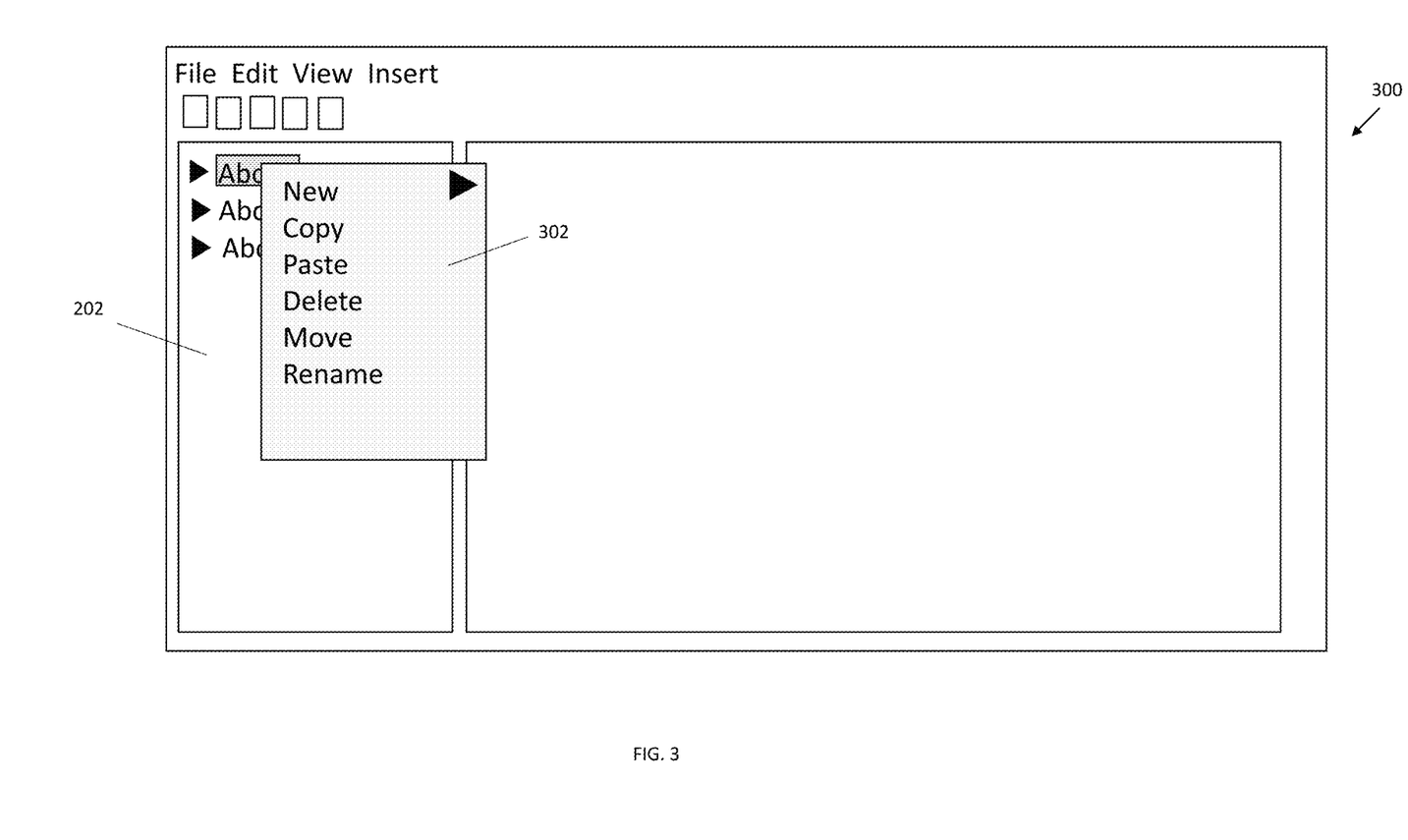
FIG. 3 shows a screen shot illustrating the results of a step in which a right click is performed in a directory area of the software application.

FIG. 3 shows a screen shot 300 illustrating the results of a step in which a right click is performed in the directory area 202. Performing the right click in the directory area 202 opens a menu 302 with a plurality of menu options. When the presenter performs the right click, the capture component 106 captures the right click command and creates a corresponding script, such as shown below:

```
<step2 action=rightclick mouse_position=(10,90)>
<gif file=20170324143505.gif />
<user_text="Abcd1" />
<class name="org.eclipse.resource.Options" />
</step2>
```

Figure 4:
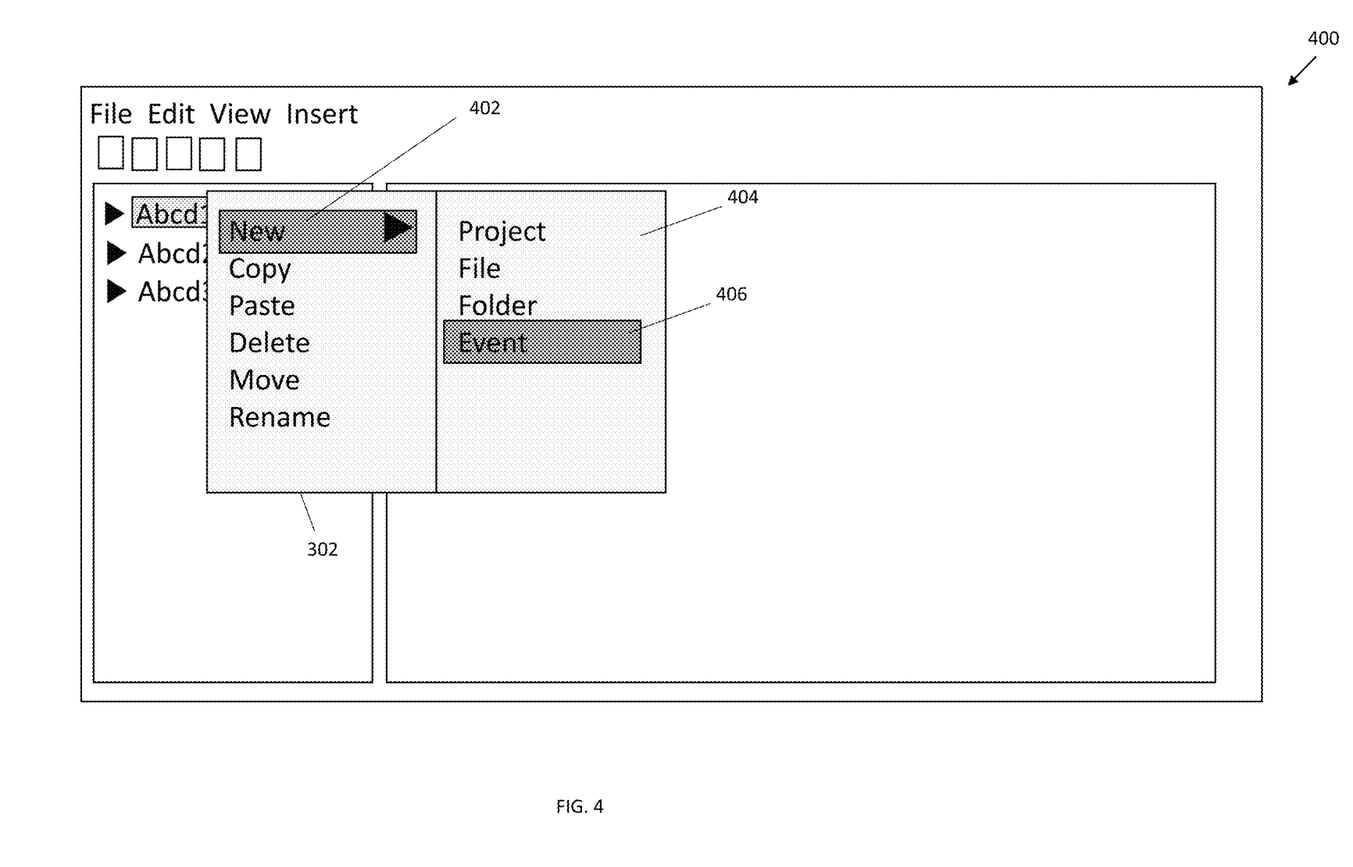
FIG. 4 illustrates a screen shot illustrating the results of a step in which the presenter moves a mouse to select a menu option from a menu.

FIG. 4 illustrates a screen shot 400 illustrating the results of a step in which the presenter moves the mouse to select a menu option from the menu 302. By moving the mouse over the menu option (e.g., "New" 402), a sub-menu 404 is open. When the presenter moves the mouse over the selected menu option, the capture component 106 captures this motion and creates a corresponding script, such as shown below:

```
<step3 action=mousemove mouse_position=(30,50)>
<gif file=20170324143701.gif />
</step3>
```

Additionally, when the presenter moves the mouse over a menu item (e.g., "Event" 406) of the submenu 404 and performs a left click at the mouse, the capture component 106 creates a corresponding script, such as shown below. At this step, the presenter can set an exploration point which is indicated by the script "explorable=yes".

```
<step4 action=click mouse_position=(50,30) explorable=yes>
<gif file=20170324143909.gif />
<clicked_text="Event" />
<class name="com.abc.softwareappabcd.Event" method="createWizard" />
</step4>
```

Figure 5:
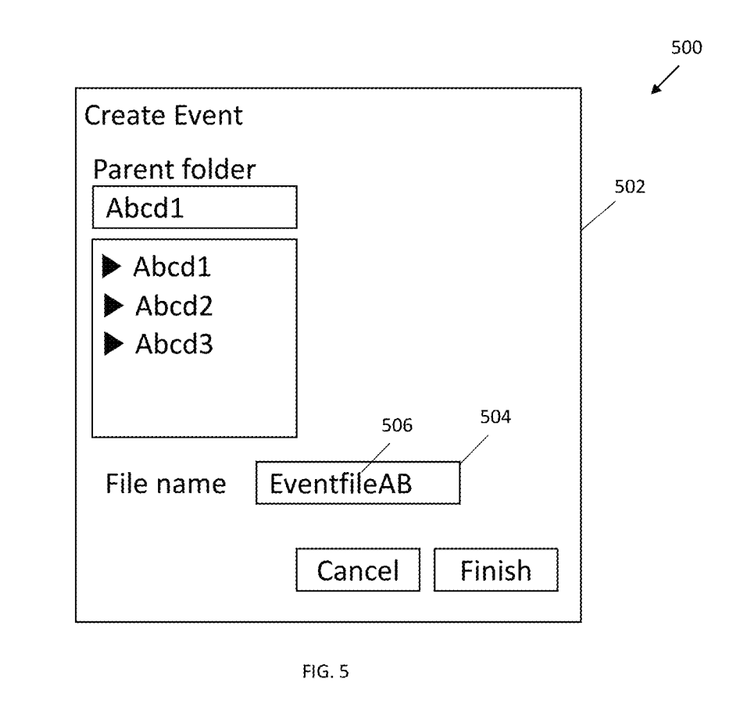
FIG. 5 illustrates a screen shot illustrating the results of the selection made in FIG. 4.

FIG. 5 illustrates a screen shot 500 illustrating the results of the selection made in FIG. 4. A dialog box 502 is shown with a field 504 for data entry. Data 506 has been entered. This information is captured by the capture component 106 and used to creates a corresponding script, such as shown below:

```
<step5 action=click mouse_position=(100,30)>
<gif file=20170324143909.gif />
<input text="EventfileAB" />
</step5>
```

Figure 6:
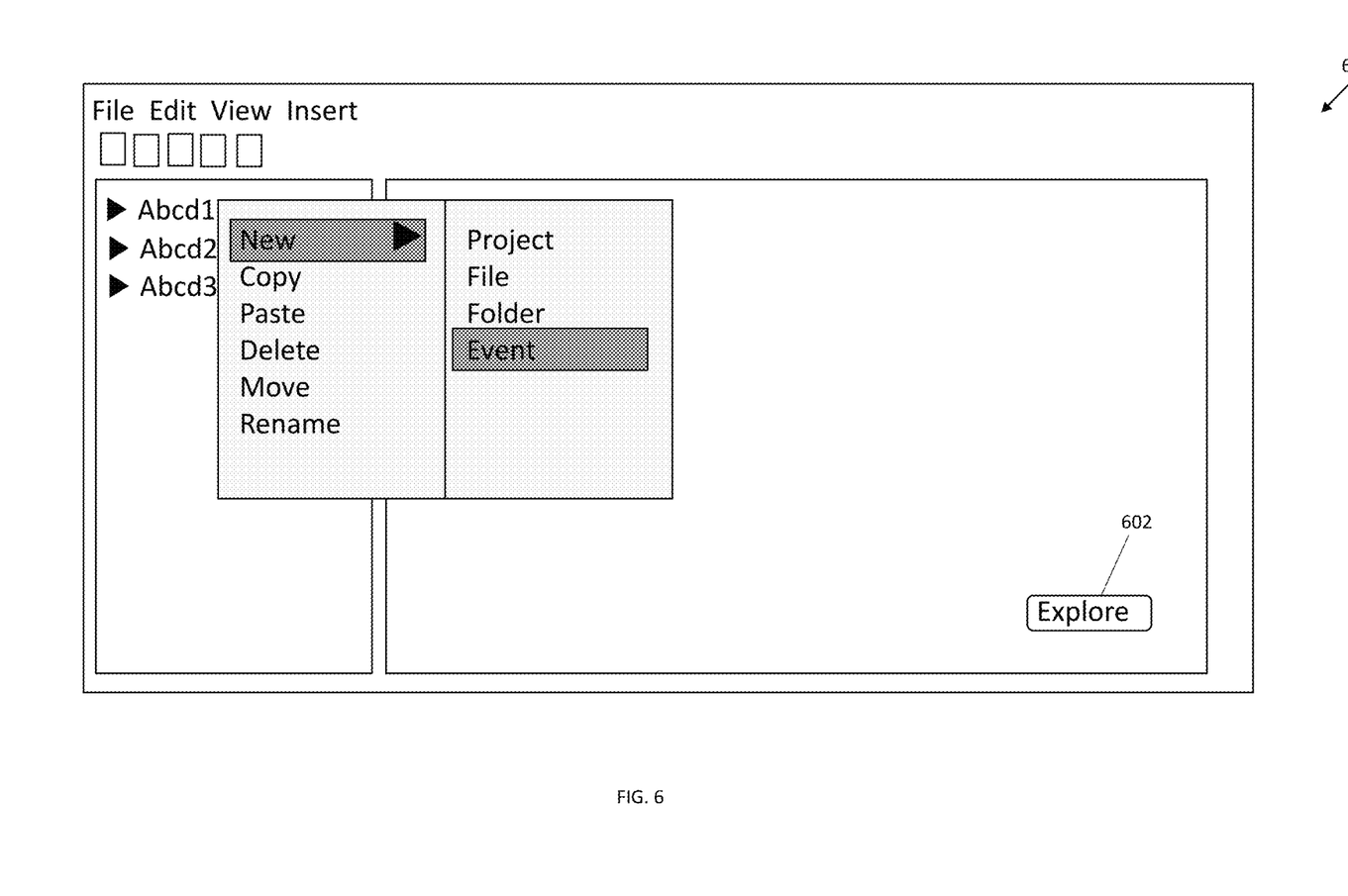
FIG. 6 shows a screen shot illustrating a step in the software application and an exploration button that the viewer can select to exit from a demonstration script.
Figure 7:
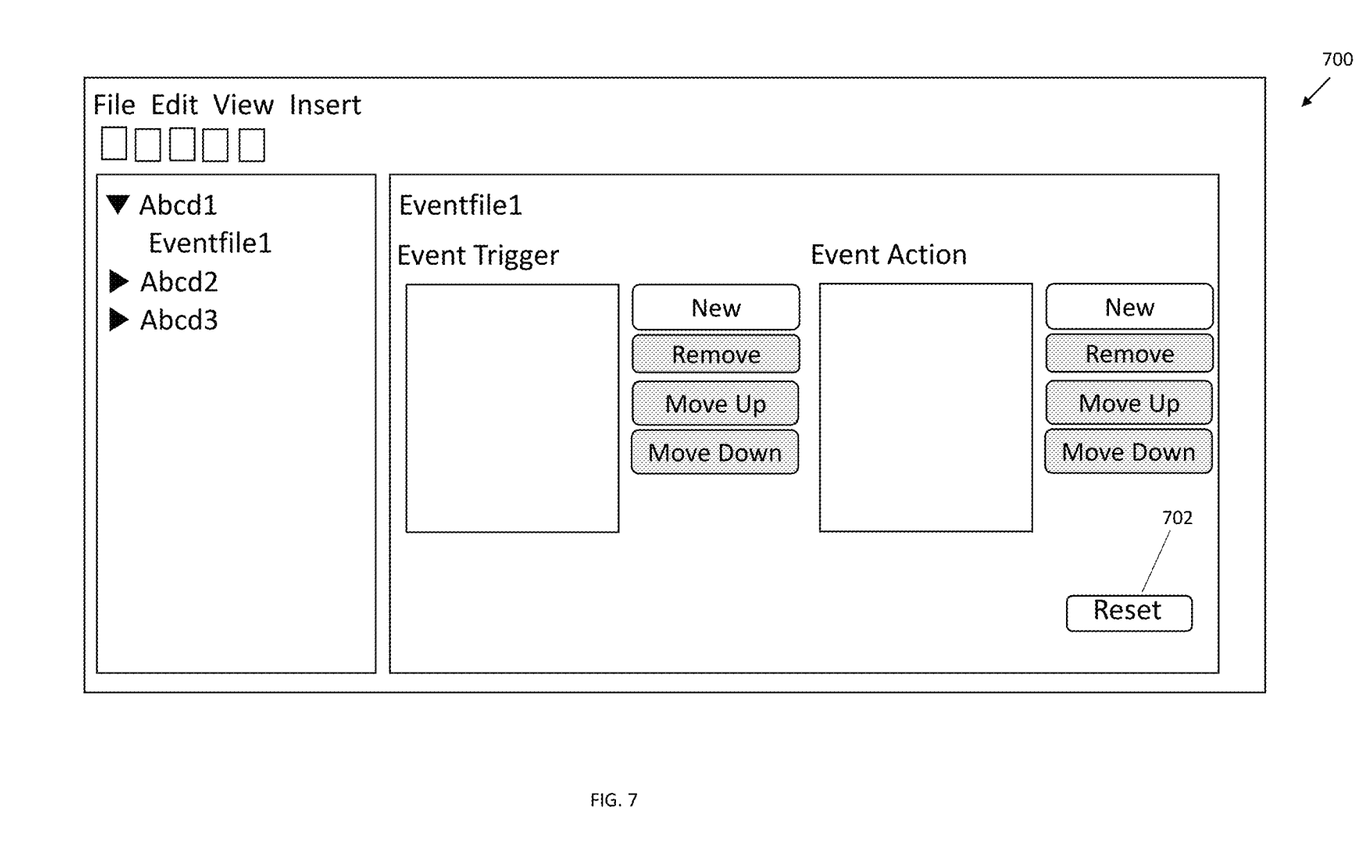
FIG. 7 shows a screen shot illustrating a reset button that can be selected by the viewer to resume the demonstration.

FIGS. 6-7 shows various software states as seen by the viewer, for illustrative purposes.

FIG. 6 shows a screen shot 600 from a viewer environment 102 illustrating a step in the software application and an exploration button 602 that the viewer can select to exit from the demonstration script 110. The exploration button 602 is enabled by the presenter and provides the viewer an option to take control of the software being viewed and to explore the software beyond the actions taken by the presenter.

In particular, the screen shot 600 shows the viewer software application at the same point in the script as shown in FIG. 4 (which provides the presenter's view).

FIG. 7 shows a screen shot 700 from the viewer environment illustrating a reset button 702 that can be selected by the viewer to resume the demonstration. The viewer can select the exploration button 602 to explore the software application and can select the reset button 702 to return to the demonstration from the point at which the viewer halted the demonstration and explored the software separately. When the exploration button 602 is selected, the invoker component 108 records the most recent step that the viewer has executed and captures the state of the viewer's software application and its environment at the point of exploration for later restoration. When the reset button 702 is selected, the invoker component 108 places the viewer back at the viewer's software environment as it was immediately before the viewer invoked the exploration button 602. In particular, the viewer will see the software application at the same point in the script as shown in FIG. 6

Figure 8:
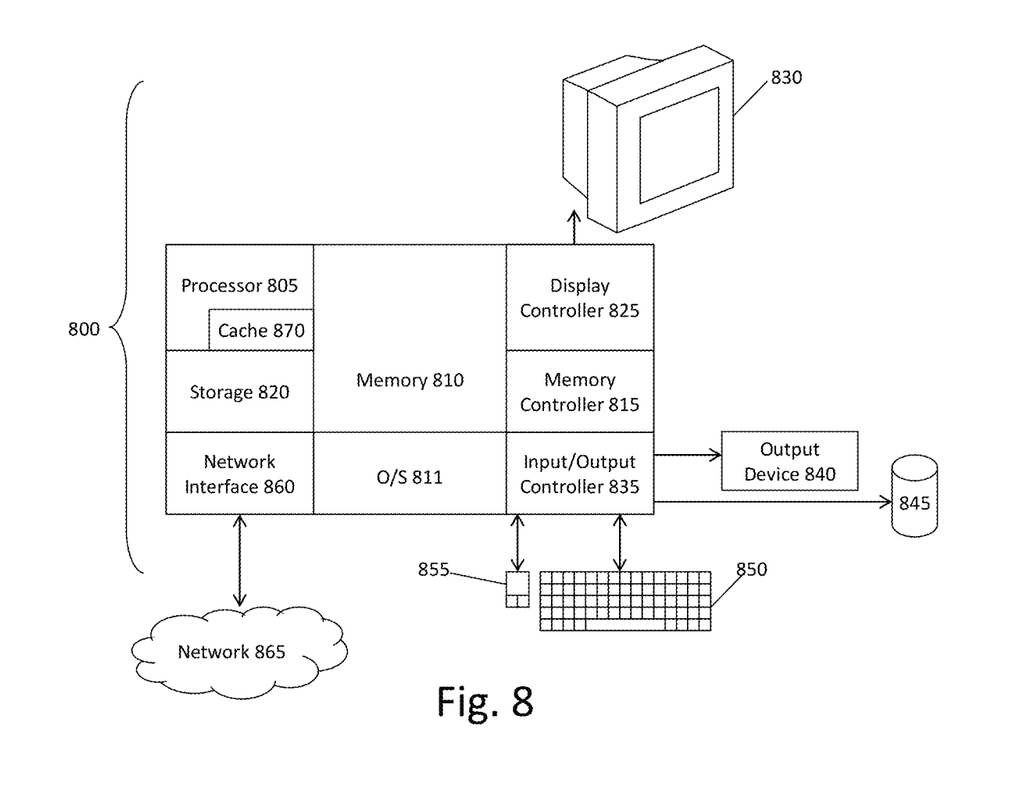
FIG. 8 illustrates a block diagram of a computer system for use in implementing a system or method according to some embodiments of this disclosure.

FIG. 8 illustrates a block diagram of a computer system 800 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 800, such as a personal computer, workstation, minicomputer, or mainframe computer.

In some embodiments, as shown in FIG. 8, the computer system 800 includes a processor 805, memory 810 coupled to a memory controller 815, and one or more input devices 845 and/or output devices 840, such as peripherals, that are communicatively coupled via a local I/O controller 835. These devices 840 and 845 may include, for example, a printer, a scanner, a microphone, and the like. Input devices such as a conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be a custom made or commercially available processor, a central processing unit (CPU), an auxiliary processor among several processors associated with the computer system 800, a semiconductor based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, or other types of storage media. Note that the memory 810 may have a distributed architecture, where various components are situated remote from one another but may be accessed by the processor 805.

The instructions in memory 810 may include one or more separate programs, each of which comprises an ordered listing of executable instructions for implementing logical functions. In the example of FIG. 10, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 820, which may be a storage device such as a hard disk drive or solid state drive. The stored instructions in memory 810 or in storage 820 may include those enabling the processor to execute one or more aspects of the systems and methods of this disclosure.

The computer system 800 may further include a display controller 825 coupled to a display 830. In some embodiments, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In some embodiments, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 800, such as that illustrated in FIG. 8.

Technical effects and benefits of some embodiments include improving a tagging process of an image, and improved training of a network in order to tag an image The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for demonstrating a software application on a computer, the computer-implemented method comprising:
    recording, at a capture component in a presenter environment run on the computer, one or more steps performed by a presenter on a first copy of the software application being run in the presenter environment;
    accessing, by an invoker component in a viewer environment, the one or more steps; and
    performing, by the invoker component, the one or more steps on a second copy of the software application being run in the viewer environment of a different computer,
    wherein recording the one or more steps further comprises creating a script at the capture component for the one or more steps when the one or more steps are executed, the script is an XML script that records metadata associated with each of the one or more steps performed by the presenter,
    wherein the invoker component is configured to perform the one or more steps based on commands from a viewer to move one of forward and backward in the script, and
    wherein the script includes an exploration point set by the presenter, the exploration point configured to allow the viewer to exit from the script in order to exercise the software application themselves, based what has been learned from the script, and wherein the script returns to the software application to its prior state when the user resumes the demonstration.

2. The computer-implemented method of claim 1, wherein performing the one or more steps on the second copy further comprises reading the script at the invoker component.

3. The computer-implemented method of claim 1, further comprises selecting, at the invoker component, a command to allow the viewer to separate from the one or more steps at a selected exploration point, wherein the command instructs the invoker component to record a most recent step that the viewer has executed and capture a state of the viewer's software application and its environment at the point of exploration for later restoration.

4. The computer-implemented method of claim 3, further comprising selecting, at the invoker component, a return to the one or more steps at the selected exploration point.

5. The computer-implemented method of claim 1 further comprising launching the second copy of the software application at the viewer environment by reading the script at the invoker component.

6. The computer-implemented method of claim 1, further comprising controlling a pace of a demonstration of the software application at the viewer environment.

7. A system for demonstrating a software application, the system comprising:
    a capture component configured to record a step of a presenter at a first copy of the software application in a presenter environment; and
    an invoker component configured to receive the step and perform the step on a second copy of the software application in a viewer environment,
    wherein capture component is further configured to create a script to record the step of the presenter, the script comprising an XML script that includes metadata associated with each of steps performed by the presenter,
    wherein the invoker component is configured to perform the one or more steps based on commands from a viewer to move one of forward and backward in the script, and
    wherein the script includes an exploration point set by the presenter, the exploration point configured to allow the viewer exit from the script in order to exercise the software application themselves, based what has been learned from the script, and wherein the script returns to the software application to its prior state when the user resumes the demonstration.

8. The system of claim 7, wherein the invoker component reads the script to perform the step at the second copy.

9. The system of claim 8, wherein the invoker component allows the viewer to separate from the script at a selected exploration point in response to an exploration command from a viewer and captures the state of the viewer's software application and its environment at the point of exploration.

10. The system of claim 9, wherein the invoker component allows the viewer to return to the exploration point in response to reset command from the viewer, using the captured state of the viewer's software application and its environment.

11. The system of claim 7, wherein the invoker component is further configured to launch the second copy of the software application at the viewer environment by reading the script.

12. The system of claim 7, wherein the invoker component controls a pace of a demonstration of the second copy of the software application at the viewer environment.

13. A computer program product for demonstrating a software application, the computer program product comprising a computer readable storage medium having program instructions embodied therewith, the program instructions executable by a processor to cause the processor to perform:
   recording, at a capture component in a presenter environment run on the computer, one or more steps performed by a presenter on a first copy of the software application being run in the presenter environment;
   accessing, by an invoker component in a viewer environment run on computer, the one or more steps; and
   performing, by the invoker component, the one or more steps on a second copy of the software application being run in the viewer environment,
   wherein recording the one or more steps further comprises creating a script at the capture component for the one or more steps when the one or more steps are executed, the script is an XML, script that records metadata associated with each of the one or more steps performed by the presenter,
   wherein the invoker component is configured to perform the one or more steps based on commands from a viewer to move one of forward and backward in the script, and
   wherein the script includes an exploration point set by the presenter, the exploration point configured to allow the viewer exit from the script in order to exercise the software application themselves, based what has been learned from the script, and wherein the script returns to the software application to its prior state when the user resumes the demonstration.

14. The computer program product of claim 13, wherein performing the one or more steps on the second copy further comprises reading the script at the invoker component.

15. The computer program product of claim 13, wherein the invoker component allows the viewer to separate from the script at a selected exploration point in response to an exploration command from a viewer, wherein the exploration command instructs the invoker component to record a most recent step that the viewer has executed and capture a state of the viewer's software application and its environment at the point of exploration for later restoration.

16. The computer program product of claim 15, wherein the invoker component allows the viewer to return to the selected exploration point in response to reset command from the viewer.

17. The computer program product of claim 13, wherein the invoker component is further configured to launch the second copy of the software application at the viewer environment by reading the script.

* * * * *